United States Patent [19]

Mezera et al.

[11] 4,322,630
[45] Mar. 30, 1982

[54] ELECTRICAL POWER GENERATING SYSTEM

[75] Inventors: John R. Mezera, Glendale Heights; James T. Dimitrios, Barrington, both of Ill.; Graham R. Phillips, St. Louis, Mo.

[73] Assignee: Gould Inc., Rolling Meadows, Ill.

[21] Appl. No.: 130,784

[22] Filed: Mar. 17, 1980

[51] Int. Cl.$^3$ ............................................. H02J 3/08
[52] U.S. Cl. ..................................... 290/40 C; 307/87
[58] Field of Search ............. 290/40 C, 40 R; 322/14, 322/15; 310/68 C; 307/68, 86, 87

[56] References Cited

U.S. PATENT DOCUMENTS

| | | | |
|---|---|---|---|
| 2,546,023 | 3/1951 | Stamm | 290/8 |
| 2,658,152 | 11/1953 | Brancke | 290/3 |
| 2,683,817 | 7/1954 | Kolhoff | 290/17 |
| 2,932,782 | 4/1960 | Newbold et al. | 322/19 |
| 3,263,142 | 7/1966 | Adoutte et al. | 318/99 |
| 3,325,650 | 6/1967 | Barnes | 307/87 |
| 3,340,883 | 9/1967 | Peternel | 137/26 |
| 3,520,133 | 7/1970 | Loft et al. | 60/39.14 |
| 3,621,370 | 11/1971 | Vandervort | 322/23 |
| 3,662,251 | 5/1972 | Smith | 322/23 |
| 3,878,400 | 4/1975 | McSparran | 290/14 |
| 3,919,623 | 11/1975 | Reuther | 322/1 S |
| 4,114,084 | 9/1978 | Glaudel et al. | 290/40 R |
| 4,117,344 | 9/1978 | Boerstler et al. | 290/52 |
| 4,136,286 | 1/1979 | O'Halloran et al. | 307/57 |
| 4,256,972 | 3/1981 | Wyatt et al. | 307/87 |

*Primary Examiner*—J. V. Truhe
*Assistant Examiner*—Shelley Wade
*Attorney, Agent, or Firm*—Harold Huberfeld

[57] ABSTRACT

An electrical power generating system includes a prime mover having a throttle control for converting a source of input energy into a mechanical output. The system includes an electrical generator having a plurality of output windings and a field winding for exciting the output windings. The generator is mechanically coupled to the mechanical output of the prime mover. Means are provided for sensing a plurality of parameters related to the performance of the system and further means are provided for converting each of the sensed parameters into a digital signal indicative of the magnitude of the sensed parameter. Additional means are provided responsive to the digital signals for developing a plurality of electrical output signals. The electrical output signals are utilized to control either or both the generator and the prime mover to thereby control the output of the power generating system. The system is further provided with circuits for sensing the phase position of the generator output voltage and current and the voltage in a main electrical power conductor. Accordingly, when the generator output is added to the power in the main power conductors, it is done so in phase. Some of the parameters sensed are generator output voltage, current and frequency, generator field winding current and engine throttle position. A digital logic circuit controls the excitation of the generator field winding to thereby control the generator output voltage and current.

5 Claims, 7 Drawing Figures

ELECTRICAL POWER GENERATING SYSTEM

BACKGROUND OF THE INVENTION

This invention relates generally to electrical power generating systems and more particularly to an electrical power generating system wherein a generator output is controlled by simultaneously controlling the generator excitation and the speed of a prime mover.

Systems for controlling the output of an electrical generator driven by a prime mover have been in use with large generators and prime movers for some time. For example, in U.S. Pat. No. 3,878,400 to McSparran, a diesel electric locomotive has an excitation control system for a generator driven by the diesel engine. The generator excitation is controlled in response to generator output voltage and current, an error signal computed by comparing generator power output with a reference circuit output, engine rotor speed and engine temperature. Additionally, as illustrated in U.S. Pat. No. 3,340,883 to Peternel, it is known to control input energy to a prime mover in response to the load on the generator driven by that prime mover.

Such prior systems have been quite large and quite costly. To date, no prior system has been developed which, on a cost effective basis, can provide standby electrical power or auxiliary electrical power on a relatively small scale and with the same or greater degree of control as in such prior large scale systems.

Accordingly, it is an object of the present invention to provide an improved electrical generating control system for engine driven generators.

Another object of the present invention is the provision of such a control system especially suitable for small scale power generation for use as standby or auxiliary power.

It is a further object of the present invention to provide an improved control system for an engine generator set to permit a more sophisticated degree of control than has heretofore been obtainable.

Yet another object of the present invention is the provision of such a control system including safety features to protect the user and the system against unsafe or damaging conditions.

It is another object of the present invention to provide such a control system that is both economical and relatively easy to manufacture.

SUMMARY OF THE INVENTION

Accordingly, the present invention provides an electrical power generating system including a prime mover having a throttle control for converting a source of input energy into a mechanical output. The system includes an electrical generator having a plurality of output windings and a field winding for exciting the output windings. The generator is mechanically coupled to the mechanical output of the prime mover. Means are provided for sensing a plurality of parameters related to the performance of the system and further means are provided for converting each of the sensed parameters into a digital signal indicative of the magnitude of the sensed parameter. Additional means are provided responsive to the digital signals for developing a plurality of electrical output signals. The electrical output signals are utilized to control either or both the generator and the prime mover to thereby control the output of the power generating system. The system is further provided with circuits for sensing the phase position of the generator output voltage and current and the voltage in a main electrical power conductor. Accordingly, when the generator output is added to the power in the main power conductors, it is done so in phase. Some of the parameters sensed are generator output voltage, current and frequency, generator field winding current, and engine throttle position. A digital logic circuit controls the excitation of the generator field winding to thereby control the generator output voltage and current.

Other objects, advantages, and novel features of the present invention will become apparent from the following detailed description of the invention when considered in conjunction with the accompanying drawings.

DESCRIPTION OF THE PREFERRED EMBODIMENT

Figure 1:
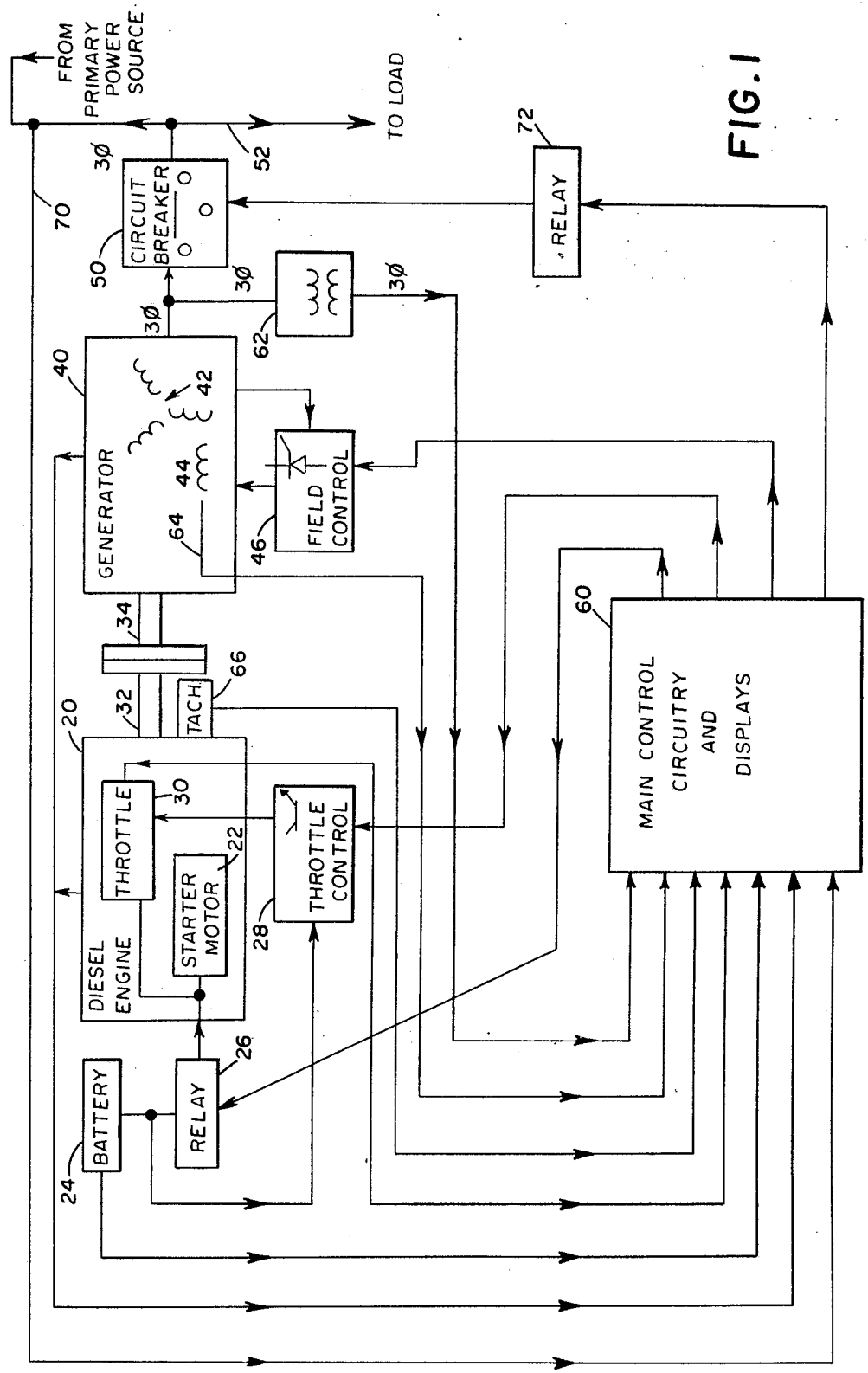
FIG. 1 shows a block circuit diagram of an electrical power generating system in accordance with the principles of the present invention.

The electrical power generating system of the present invention will now be described with reference to the system block diagrams shown in FIGS. 1 and 2. A prime mover 20, preferably in the form of a diesel engine, is coupled to a starter motor 22. The starter motor 22 may be energized by a battery 24 through a relay circuit 26. The diesel engine may be controlled by an electronic throttle control 28 which is coupled to a throttle 30 for controlling the source of input energy into the diesel engine 20. The diesel engine converts this source of input energy into a mechanical output at shaft 32. The shaft 32 is coupled to the input shaft 34 of an electrical generator 40. The generator 40 includes a standard Y-connected three phase output winding 42 and a field winding 44 for exciting the output windings 42. An electronic field control 46 is provided for controlling the excitation current in field coil 44. A circuit breaker 50 is provided for connecting the output from the generator windings 42 to a plurality of main electrical power conductors in the form of a bus 52.

A main control center 60 is provided for receiving input data from a plurality of sensors sensing parameters related to the performance of the generator system. The control center 60 converts the sensed signals into digital signals, processes the data, and delivers a plurality of output signals responsive to said input signals for controlling the output of the power generating system. Generator output voltage and current is sensed by voltage and current transformers shown generally at 62. Generator field current is sensed by means of a current transformer (not shown) at 64. Engine speed and generator output frequency are sensed by a tachometer 66. Throttle position is sensed at throttle 30 by means of a potentiometer (not shown). The voltage output of the battery 24 is monitored and fed to control 60. Although for convenience of illustration the output of generator 40, the connection between circuit breaker 50 and bus 52, bus 52, and the connections to transformers 62 are shown by a single line, these lines are all three phase lines and are labeled accordingly.

Additionally, protection against excessive operating temperatures is provided for both the generator 40 and the diesel engine 20. Six thermistors are mounted on the generator output windings at strategic points to measure the winding temperatures at all times. The operating temperature of the diesel engine 20 is monitored by three thermistors, two measuring coolant temperature and one measuring oil temperature. These output temperatures are fed to the main control 60. The voltage on electrical bus 52 is monitored by a voltage transformer (not shown) at 70.

As will be described in more detail in connection with FIG. 2, the main control circuitry 60 individually samples during each cycle, each of the input signals heretofore described, converts the analog signals to digital signals, processes the signals and produces digital outputs which are utilized to control the output of the power generating system. An output of the control 60 is delivered to relay 26 to activate the system by impressing the voltage produced by battery 24 across the starter motor 22. A diesel engine speed control signal is delivered to the throttle control 28. The throttle control 28 is shown in more detail in FIG. 5.

Generator field current is controlled by a signal from the main control 60 which is delivered to the field control 46. The circuit which develops the field control signal is shown in greater detail in FIG. 4. The field control 46 is a known circuit for controlling the amount of field excitation by controlling the firing angle of an SCR in series with the field.

Additionally, the control circuitry 60 delivers signals to a relay 72 for opening and closing circuit breaker 50. As is shown more clearly in FIG. 7, the main control 60 includes a plurality of displays and alarms for indicating the operating state of the generating system.

Figure 2:
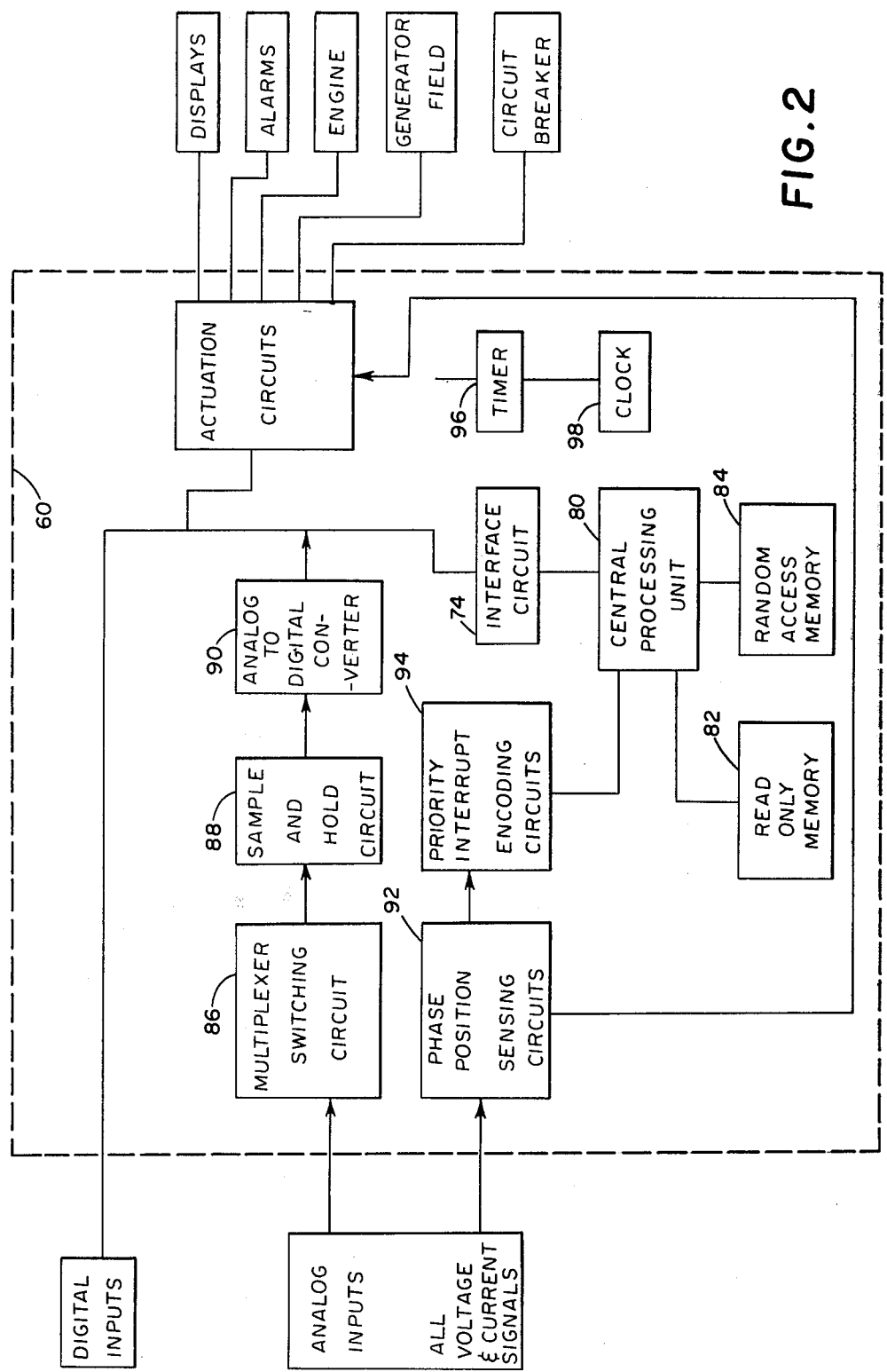
FIG. 2 shows a more detailed block circuit diagram of the control circuitry of the present invention.
Figure 7:
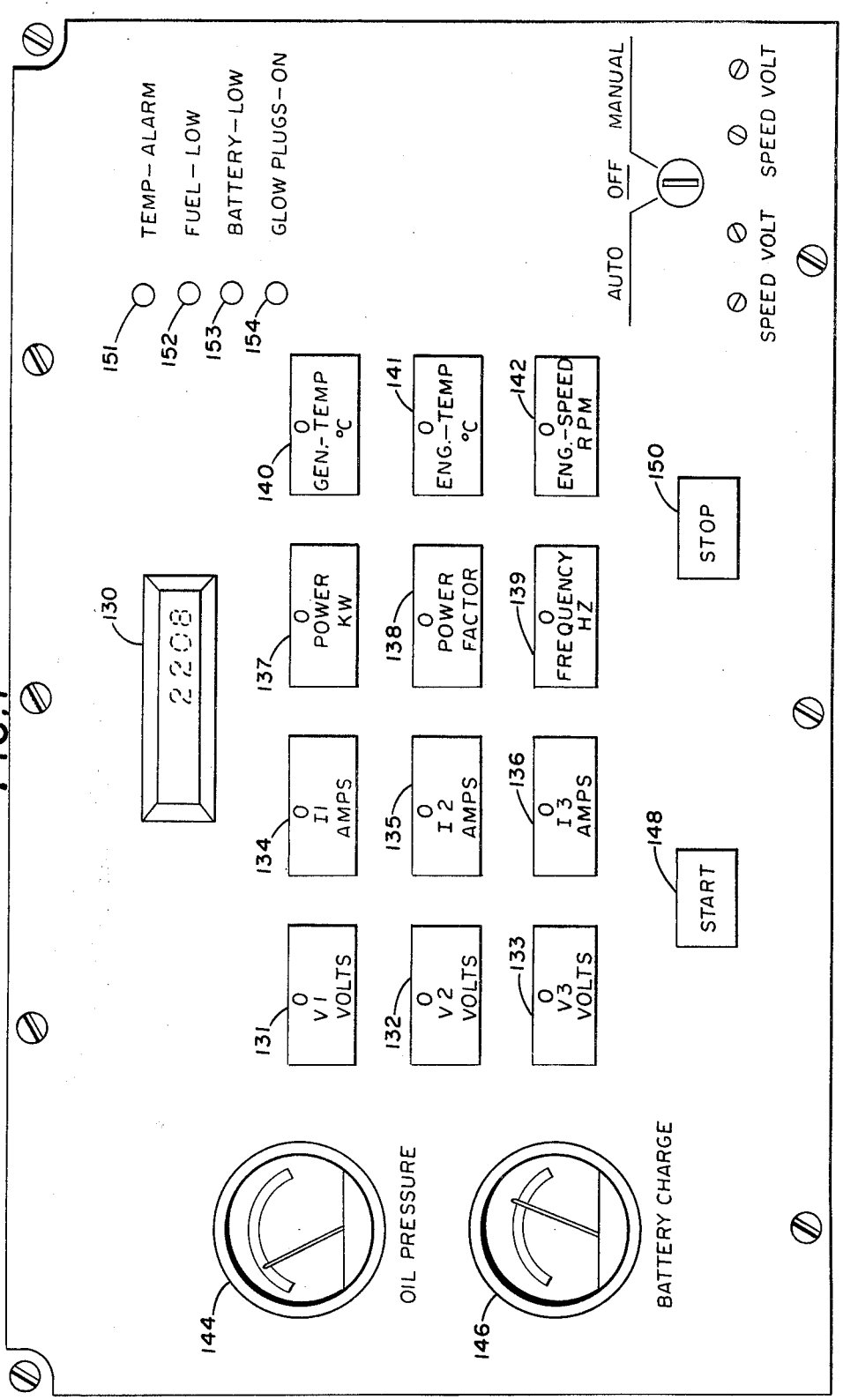
FIG. 7 shows the front panel of a housing enclosing the control circuitry of the present invention.

FIG. 2 shows, in block circuit diagram form, the control circuitry of main control 60. All digital inputs, such as the inputs from display switches shown in FIG. 7, are connected directly to an interface circuit 74. The interface circuit 74 is merely a convenient connection circuit for the central processing unit 80 having a read only memory 82 and a random access memory 84. The central processing unit is a microprocessor programmed in accordance with the program appearing in the appendix to this specification.

All analog inputs are processed to a common voltage level and fed to a multiplexer switching circuit 86 for individually delivering these signals to a sample-and-hold circuit 88 during each cycle. The multiplexer switching circuit is simply a series of cascaded known multiplexing circuits and preferably has the capability of sampling each of the signals every twenty milliseconds or less. The sample-and-hold circuit 88 is a known circuit for taking an instantaneous picture of each of the outputs of the multiplexer switching circuit and delivering these instantaneous outputs to an analog-to-digital converter 90. The output of the analog-to-digital converter 90 is delivered to the interface circuit 74 for connection to the central processing unit 80. Additionally, all voltage and current signals are connected to phase position sensing circuits 92. The term phase position, as used herein, describes the phase relationship between the essentially sinusoidal wave forms sensed, i.e., the three phases of generator output voltage and current and the single phase of bus voltage. These phase position sensing circuits are more particularly described in FIG. 3 and depict the zero crossing points of the sine waves of each of the sensed signals. The outputs of the phase position sensing circuits are transmitted to priority interrupt encoding circuit 94. The priority interrupt encoding circuit serves the purpose of combining the outputs of the phase position sensing circuits into a single digital signal to be processed by the central processing unit 80. Thus, the output of the priority interrupt encoding circuit is connected to the central processing unit 80. Additionally, a timer 96 and a clock 98 are provided to give the circuit some internal reference data. As was discussed in connection with FIG. 1, the various output actuation circuits deliver their signals to appropriate displays, alarms, the engine control, the generator field control, and the circuit breaker.

Figure 3:
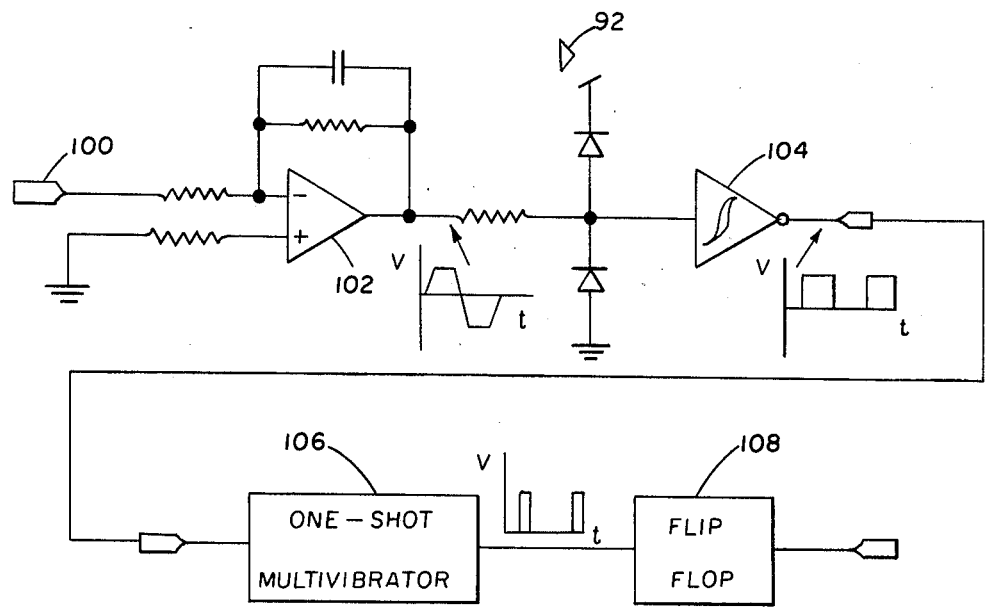
FIG. 3 shows a detailed circuit diagram of a phase position sensing circuit shown in block form in FIG. 2.

FIG. 3 shows one of the phase position sensing circuits 92. Each of the voltages on the three output phases and each of the currents in the three output phases of the generator 40 is connected to such a phase position sensing circuit 92. Additionally, one phase of the voltage from the electrical bus 52 is connected to a phase position sensing circuit 92. Each such input wave form, having essentially a sinusoidal shape, is delivered to the terminal 100 of a medium gain operational amplifier 102. The output of the medium gain amplifier 102 converts the essentially sinusoidal input wave form to a wave form closely approximating a square wave. This approximate square wave is delivered to the input of a Schmitt trigger circuit 104 which converts the approximate square wave to a plurality of unidirectional square voltage pulses. The Schmitt trigger circuit 104 also provides a sufficient level of noise immunity for the signal. These unidirectional square voltage pulses are delivered to the input of a one-shot multivibrator 106 for converting the unidirectional square wave output of the Schmitt trigger 104 to a plurality of short duration unidirectional voltage pulses. The one-shot multivibrator 106 has an inherent time constant, e.g., 14 milliseconds. This time constant prevents the retriggering of the multivibrator sooner than the expiration of that time constant. This delay helps to filter out spurious signals and thus provides additional noise immunity. These short duration unidirectional voltage pulses are temporarily stored in a flip flop circuit 108 for transmittal to central processing unit 80 when central processing unit 80 is ready to receive the signal.

Figure 4:
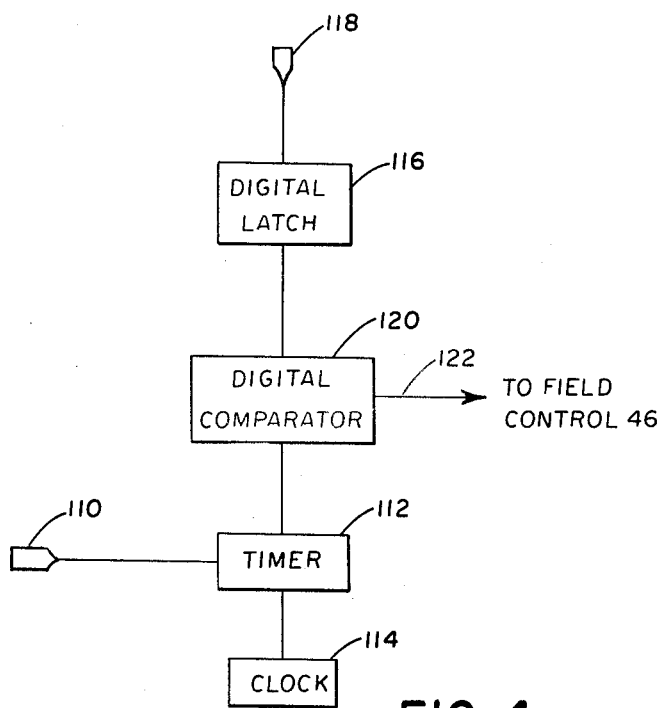
FIG. 4 shows a block diagram of a digital actuation circuit for controlling the excitation of the field winding of the generator shown in FIG. 1.

FIG. 4 shows a circuit for adjusting the firing angle of the SCR in the field control 46. An input signal on terminal 110 is received from one of the phase position sensing circuits 92. The start of a cycle is used to trigger timer 112 into producing a plurality of timed digital output signals that last for the duration of each wave form. The timer 112 is coupled to a clock 114. A digital latch 116 receives a signal from central processing unit 80 indicative of desired firing time for the field control 46. The digital latch 116 is composed of a plurality of flip flop circuits and delivers a digital trigger signal to a digital comparator 120 indicative of the desired time for triggering excitation of the generator field winding. The digital comparator 120 compares the timed reference signals produced by timer 112 with the digital trigger signals produced by digital latch 116 and generates a digital output signal at terminal 122 for delivery to the field control 46 when one of the timed digital reference signals equals the digital trigger signal. This circuit affords a particularly precise technique for controlling the firing angle of field control 46 and thus controlling the excitation of the generator 40.

Figure 5:
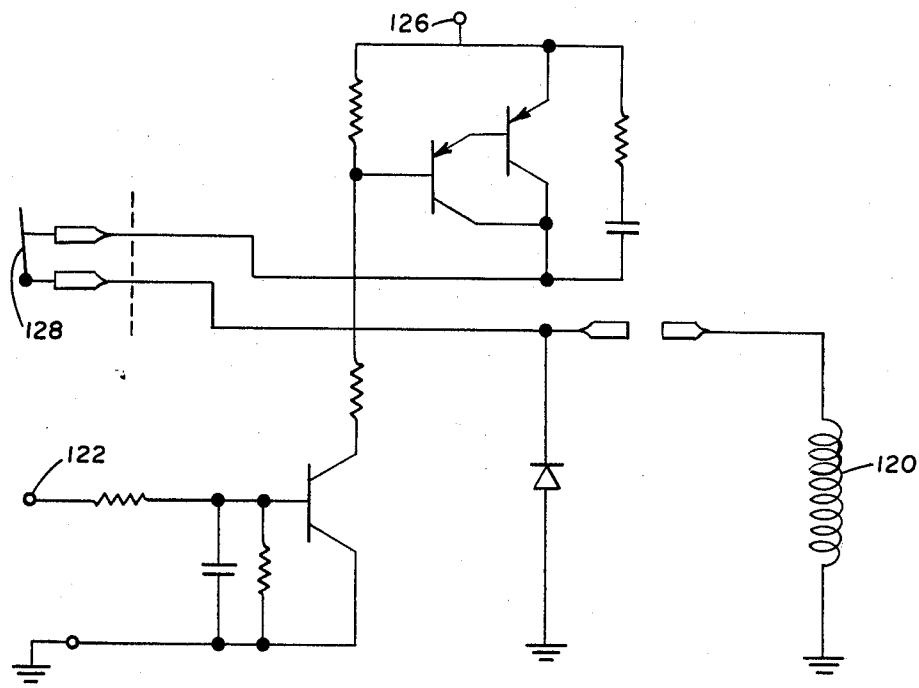
FIG. 5 shows a detailed circuit diagram of a throttle control circuit shown in FIG. 1.
Figure 6:
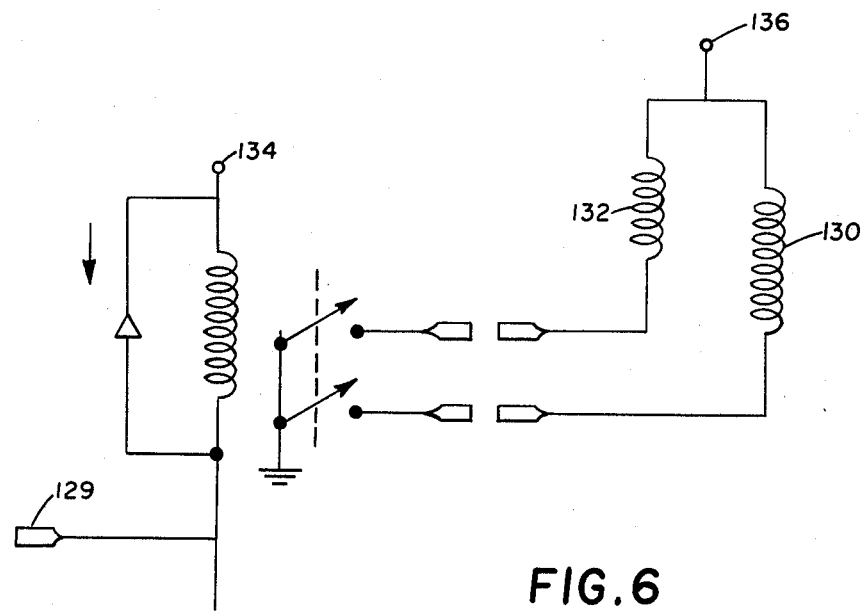
FIG. 6 shows a detailed circuit diagram of a fuel safety shut off circuit used in the generating system of the present invention.

FIGS. 5 and 6 show detail circuit diagrams of two of the actuation circuits utilized in connection with the generating system of the present invention. These circuits will not be described in great detail since their operation is generally well understood in the art.

FIG. 5 shows a circuit for controlling the position of the engine throttle 30. A throttle solenoid 120 is connected to the throttle and is energized in response to a pulse width modulated signal from the central processing unit 80 appearing on terminal 122. Terminal 126 is provided with a positive DC voltage to power the circuit. Switch 128 is normally closed. Accordingly, as a result of the pulse width of the signal on terminal 112, the duty cycle of the circuit may be varied to control the power applied to the coil 120 to thereby adjust the throttle.

FIG. 6 likewise shows a circuit for terminating the injection of fuel into diesel engine 20. In response to a signal at terminal 129 from central processing unit 80, the circuit provides power to actuation coils 130 and 132 to close a fuel valve (not shown) to thereby stall the engine 20. Positive DC power is applied to terminals 134 and 136 to power the circuit.

FIG. 7 shows the front panel of a housing including the control circuitry of the present invention. An LED readout 130 is provided for all numerical displays. At any instant in time, the user, by pushing one of the buttons 131 through 142, may obtain a numerical indication of the particular voltage current, power, power factor, frequency, temperatures or engine rpm. In addition, in the case of button 140, since six generator temperatures are monitored by the system, by successively pushing button 140, the user obtains the individual readings of each of the sensors sequentially. Engine oil pressure is displayed by gauge 144 and the state of the battery is displayed by ammeter 146. Pushbutton 148 is provided to manually start the power generating system and pushbutton switch 150 is provided to manually stop the system.

Indicator lights for overtemperature, low fuel, low battery charge, and glow plugs are provided at 151 through 154.

The electrical power generating system of the present invention may be operated by simply pushing the start button 148 which will serve to supply power to main control 60 which in turn will activate relay 26 to impress a voltage from battery 24 on starter motor 22. Should the diesel engine 20 be in a cold environment, glow coils will be energized to pre-heat the engine to facilitate starting. Alternatively, the system may be started by a remote power failure sensing relay or by an external clock, if the system is to be periodically operated. The central processing unit 80 operates to sense signals to open the throttle 30 and the air and fuel valves on engine 20. When engine speed reaches a minimum, for example 500 rpm, the engine starter is deenergized. Oil pressure is also monitored and if within a predetermined time period, for example five seconds, the oil pressure does not achieve a predetermined value, the system is automatically shutdown. Likewise, if engine speed does not reach the desired minimum within a reasonable time frame, for example ten seconds, the system is also shutdown and an alarm is sounded. After a thirty second delay, the alarm is automatically reset and the system makes a second attempt at starting the engine. If the second attempt is not successful, the system is shutdown.

As soon as engine speed monitored at tachometer 66 and generator output voltage monitored at 62 reach their steady state levels, the operation of the system is continuous. During such continuous standby operation, the system operates to maintain generator output voltage and frequency at desired levels. This is accomplished by controlling the excitation of the generator at field control 46 and simultaneously controlling the throttle position at 30. Thus, voltage control is accomplished by comparing the sensed output voltage of the generator to a reference voltage and correspondingly making any correction in field excitation should an error exist as described in connection with FIG. 4. Speed or frequency is controlled by counting pulses emitted by the timer 96 between successive zero crossing points as measured by phase position sensing circuit 92. This count is compared to a reference level and then corrected if necessary by adjusting the output signal to the throttle control 28. As was mentioned earlier, the system individually evaluates each of the sensed signals within a time frame of less than 20 milliseconds. The system also has time within this period to monitor engine oil pressure, the various temperature sensors, fuel level, and battery condition to sound an alarm should any of these values be unacceptable when compared to a reference.

To stop the system, one need merely push the stop switch 150, or the system may receive an external signal such as a time signal, or receive an internal alarm signal from the control circuit 60. Thus, the system may be automatically stopped in response to an overtemperature condition, a low oil pressure condition, or an overspeed condition. During shutdown, the system opens the circuit breaker 50, closes the engine throttle and air valve, and removes excitation from the generator field coil 44.

One of the particularly unique features of the present invention is its ability to be paralleled with another generator or with pre-existing power on another electrical line. In order to synchronize the output of generator 40 with that of the power in the external supply line, the bus voltage is sensed as at 70 and its phase position is measured, as discussed earlier. The output voltage of generator 40 and its output frequency are raised to a value slightly higher than that measured in the external power line. The phase positions of the external power line and the generator 40 are compared and when they are within a fixed limit, for example 200 microseconds, of each other the circuit breaker 50 is closed. The system then controls both the power delivered and its power factor.

To keep the power generating system of the present invention in good operating order, it is possible to set the apparatus to operate on periodic exercise cycles, for example a fifteen minute period of operation each week. In addition, it is possible to utilize the system during peak load periods if such periods are known in advance by setting the system to parallel utility operation during certain times of the day.

Accordingly, it is clear that an improved electrical generating control system for an engine driven generator has been provided. The system is especially suitable for small scale power generation and for use as standby or auxiliary power. Furthermore, the system provides a more sophisticated degree of control than has heretofore been available on any system. The system includes a variety of safety controls such as overtemperature, overspeed and low oil pressure alarm and shutdown capabilities. Because of its compact size, the system is both economical and relatively easy to manufacture and use.

While there has been described what is at present considered to be the preferred embodiment of the present invention, it will be obvious to those skilled in the art that various changes and modifications may be made therein, without departing from the invention, and it is, therefor, aimed in the appended claims to cover all such changes and modifications as fall within the true spirit and scope of the invention.

What is claimed is:

1. An electrical power generating system for providing both standby power and auxiliary on-line power to a plurality of main electrical power conductors comprising:
   (a) a prime mover for converting a source of energy into a mechanical output,
   (b) an electrical generator having a plurality of output windings and a field winding for exciting said output windings, said generator being coupled to said mechanical output,
   (c) means for electrically connecting said generator output windings with said main power conductors,
   (d) means for sensing the voltage and current provided by said generator output windings,
   (e) means for sensing the voltage in at least one of said main power conductors, and
   (f) means for sensing the phase position of said generator output voltage and current and said voltage in said main electrical power conductor, whereby said generator output may be added in phase to the power in said main power conductors, said means for sensing the phase position of said generator output voltage further including means coupled to said sensed output voltage for converting the output voltage wave form to a wave form closely approximating a square wave, means for converting said wave form closely approximating a square wave to a plurality of unidirectional square voltage pulses, means coupled to said unidirectional square voltage pulses for converting said square voltage pulses to a plurality of unidirectional short duration voltage pulses, and means coupled to said short duration unidirectional voltage pulses for storing said pulses for transmittal to a central processing unit.

2. A generating system as defined in claim 1, wherein said means for converting said sensed voltage wave form to a wave form closely approximating a square wave is an operational amplifier.

3. A generating system as defined in claim 1, wherein said means for converting said wave form approximating a square wave to a plurality of unidirectional square voltage pulses is a Schmitt trigger circuit.

4. A generating system as defined in claim 1, wherein said means for converting said unidirectional square wave voltage pulses to a plurality of short duration unidirectional voltage pulses is a one shot multivibrator circuit.

5. A generating system as defined in claim 1, wherein said means for storing said unidirectional voltage pulses is a flip flop circuit.

* * * * *